(12) United States Patent
Karbarz

(10) Patent No.: US 8,771,621 B2
(45) Date of Patent: Jul. 8, 2014

(54) RECOVERY METHOD FOR A CONTINUOUS CALCIUM EXTRACTION AND PCC PRODUCTION

(71) Applicant: Corex Materials, Inc., Houston, TX (US)

(72) Inventor: Frank A. Karbarz, Houston, TX (US)

(73) Assignee: Corex Materials, Inc., Houston, TX (US)

( * ) Notice: Subject to any disclaimer, the term of this patent is extended or adjusted under 35 U.S.C. 154(b) by 0 days.

(21) Appl. No.: 13/723,976

(22) Filed: Dec. 21, 2012

(65) Prior Publication Data

US 2013/0164198 A1   Jun. 27, 2013

Related U.S. Application Data

(60) Provisional application No. 61/578,676, filed on Dec. 21, 2011.

(51) Int. Cl.
*C22B 26/20* (2006.01)

(52) U.S. Cl.
USPC .......................................... 423/165; 423/430

(58) Field of Classification Search
None
See application file for complete search history.

(56) References Cited

U.S. PATENT DOCUMENTS

| | | | |
|---|---|---|---|
| 5,376,343 A | 12/1994 | Fouche | |
| 5,939,036 A | 8/1999 | Porter et al. | |
| 6,143,065 A | 11/2000 | Freeman et al. | |
| 2004/0013596 A1 | 1/2004 | Fouche et al. | |
| 2011/0139628 A1 | 6/2011 | Teir et al. | |
| 2013/0064752 A1* | 3/2013 | Kim et al. | ...................... 423/429 |

FOREIGN PATENT DOCUMENTS

| | | | |
|---|---|---|---|
| JP | S51109281 A | 9/1976 | |
| JP | 2005097072 A | 4/2005 | |

OTHER PUBLICATIONS

PCT/US2012/071238 International Search Report and Written Opinion dated Apr. 12, 2013 (10 p.).

* cited by examiner

*Primary Examiner* — Steven Bos
(74) *Attorney, Agent, or Firm* — Conley Rose, P.C.

(57) ABSTRACT

A method of mineralizing calcium from industrial waste comprising extracting calcium ions from a suspension of calcium rich granular particles and aqueous ammonium nitrate to form a calcium-rich first fraction and a heavy second fraction. The heavy second fraction is separated from the first fraction and the calcium-rich first fraction is carbonated with a gas comprising carbon dioxide to form a suspension of precipitated calcium carbonate and aqueous ammonium nitrate. The precipitate is separated from the aqueous ammonium nitrate by centrifugal means and the separated heavy second fraction comprises an enriched weight percent of iron.

15 Claims, 4 Drawing Sheets

Sequential Separation & Sequestration

- pH-swing chemistry
- Two-pass liquid/solid separation
- High throughput, filterless
- Reusable solvent
- Ambient Temperature
- Ambient Pressure

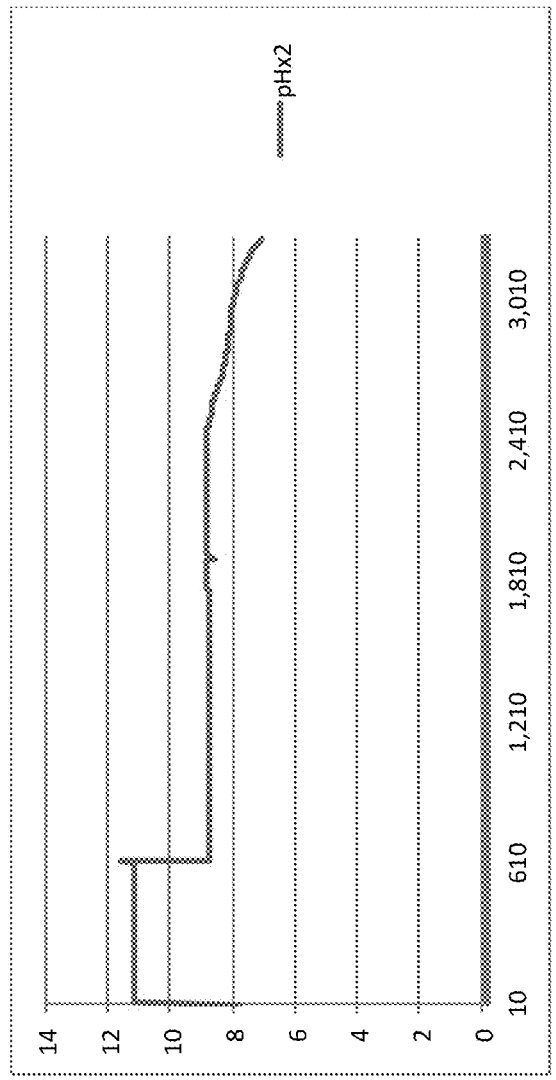

RECOVERY METHOD FOR A CONTINUOUS CALCIUM EXTRACTION AND PCC PRODUCTION

CROSS-REFERENCE TO RELATED APPLICATIONS

This application claims priority to U.S. Provisional Application No. 61/578,676, filed Dec. 21, 2011.

STATEMENT REGARDING FEDERALLY SPONSORED RESEARCH OR DEVELOPMENT

Not applicable.

BACKGROUND

1. Field of the Invention

The invention relates generally to an economically and environmentally efficient recovery method for continuous calcium extraction; precipitated calcium carbonate production (PCC); and simultaneous iron enrichment which consumes industrial waste products and green house gases as starting materials.

2. Background of the Invention

The increasing atmospheric concentration of $CO_2$ attributed to fossil fuel combustion is a serious problem, which contributes significantly to global warming. It is estimated that $CO_2$ emission by the year 2100 will be approximately four times greater than that in 2000. Therefore, finding a practical method of reducing $CO_2$ emissions is paramount. Methods have been proposed such as $CO_2$ capture and sequestration (such methods include geological storage or ocean sequestration). However, currently proposed $CO_2$ capture and separation processes are energy consuming and are the main reasons for the high cost of the sequestration process.

Coal and steel industries produce large volumes of ash and slag as industrial solid wastes, and flu gases that are rich in carbon dioxide. Slag is the partially vitreous by-product of smelting ore to separate a metal (usually iron) fraction, from the unwanted (siliceous) fraction. Slag is usually considered to be a mixture of metal oxides and silicon dioxide. However, slags can contain metal sulfides and metal atoms in the elemental form, further the elemental constituents of slag will vary based on the geographic location from where the ore is mined. Slag from steel mills in ferrous smelting, mainly contains oxides of calcium, silicon, magnesium, and aluminum. Any sandy component or quartz component of the original ore automatically carries through the smelting process as silicon dioxide.

Once smelting is complete, the slag is typically channeled out of the furnace, and flash cooled with water. This rapid cooling, often from a temperature of around 2,600° F. (1,430° C.), comprises the start of the slag granulating process. Water then carries the slag as slurry to agitation tanks. The filter beds then retain the slag granules, which may be ground further. Typically, slag will be recycled until it is depleted of iron, but extraction process limitations means that a residual amount of iron (10%), is still present in the slag. The slag also contains about 40% calcium, typically in the form of calcium silicates.

While the residual iron is valuable to the steel industry, the cost of further extraction and recovery is prohibitive. For example, prior art methods include grinding the slag to form ultra fine particles, thereby freeing the bound iron, which can be removed magnetically; however the electrical cost of mechanically grinding the slag negates the value of the iron recovered. The calcium rich slag granules, calcium rich slag fines or combinations thereof, are then typically stored in landfill.

Evidently, in the U.S. alone, these industries produce many millions of tons annually of solid waste (which has very little economic value) and green house gases that pose a serious environmental impact.

Accordingly, there remains a need in the art for a method of reducing such waste that is both economically and environmentally viable. As such, embodiments described herein address the requirement for sequestration of environmentally harmful carbon dioxide by integrating carbon mineralization and iron recovery through slag refining, whereby the carbon mineralization produces high grade PCC.

In addition, this process yields near 100% conversion of such industrial wastes to environmentally stable and commercially valuable end products, by sequestering $CO_2$. More over the process is itself environmentally a "sum zero system", whereby all input chemicals that are not directly consumed in generating the reaction products approach 100% recycleable where in some embodiments chemical losses (weight % or molar) are due to limitations of the mechanical process control, or slippage, or entrainment, rather than a molar consumption due to chemical reactions]

Other objects and advantages of the invention will appear from the following description.

BRIEF SUMMARY OF THE DISCLOSED EMBODIMENTS

These and other needs in the art are addressed in one embodiment of the present invention by a method of mineralizing calcium from industrial waste comprising: extracting calcium ions from a suspension of calcium rich particles and aqueous ammonium nitrate, forming a calcium-rich first fraction and a heavy second fraction; wherein the heavy second fraction is separated from the first fraction by centrifugal means; carbonating the calcium-rich first fraction with a gas comprising carbon dioxide, forming a suspension of precipitated calcium carbonate, and aqueous ammonium nitrate, the precipitate is separated from the aqueous ammonium nitrate by centrifugal means; and the heavy second fraction comprises an enriched weight percent of iron. In another embodiment, of method herein provided, the gas comprising carbon dioxide is industrial flu gas; industrial waste gas; pure $CO_2$ gas; atmospheric $CO_2$ or combinations thereof.

In a further embodiment of the above described method, the calcium rich particles may be at least one of ash, fly ash; kiln dust; incinerator waste; waste lime; waste stream calcium oxide; or waste stream calcium hydroxide.

In another embodiment of the method the particles are in granular form. In a further embodiment of the method, leachate is ammonium nitrate; and in a further still embodiment the leachate is ammonium chloride. In another embodiment of the method of mineralizing calcium from industrial waste the ratio of leachate to calcium ions is 1:1 to 100:1, in a further embodiment the ratio of leachate to calcium ions is 1:1 to 2:1 and in a further still embodiment the ratio of leachate to calcium ions is 1.25:1.

In another embodiment of the method described above, the method proceeds under ambient temperature and pressure, which can readily be observed from FIG. 3b. In some embodiments, the method of mineralization occurs in situ of an industrial process, in another embodiment, the mineralization occurs proximal to an industrial process, and in a further embodiment the method is performed on a movable object.

In another embodiment of the method of mineralizing calcium from industrial waste, calcium carbonate is crystalline and comprise at least one of scalenohedral, rhombohedral and prismatic crystals. In further embodiment the calcium carbonate is at least 95% pure; and is comprised of at least 90% rhombohedral crystals, and in a still further embodiment the crystals are about 5 mm to about 200 microns in size. In another embodiment the crystals are about 1 micron to about 5 microns in size. In a further embodiment the particle size growth is controlled by the rate of $CO_2$ addition to the calcium iron rich solution (first fraction). In one embodiment of the method of mineralizing calcium from industrial waste, the method is zero sum energy method.

In another embodiment, a method of enriching the iron content of calcium rich industrial waste is provided, the method comprising: extracting calcium ions from a suspension of starting material of calcium rich industrial waste and aqueous ammonium nitrate, forming a calcium-rich first fraction and a heavy second fraction; wherein the heavy second fraction is separated from said first fraction by centrifugal means (such as a horizontal decanter); and the heavy second fraction comprises an enriched weight percent of iron; and wherein the second fraction has increased (see for example Vilciu, I., U.P.B. Sci. Bull., Series B, Vol. 73, Iss. 2, 2011, ISSN 1454-2331; incorporated herein in its entirety by reference) as compared to said starting material, and has increased stability as compared to the starting material due to neutralizing the change in density due to the lack of presence of hydrating calcium oxide. Further unreacted calcium in concrete formed by typical slag starting materials do not initially react but will do later contributing to spalling, such an event may not be seen with siliceous products of the present invention used under such circumstances.

In a further embodiment the method of enriching the iron content of calcium rich industrial waste further comprises carbonating the calcium-rich first fraction with a gas comprising carbon dioxide, forming a suspension of precipitated calcium carbonate (PCC), wherein said PCC is separated from said aqueous ammonium nitrate by centrifugal means.

In another embodiment a method for producing calcium carbonate is provided, containing the steps of: a) extraction of alkaline industrial waste and by-products using as a first extraction solvent an aqueous solution of a salt formed from a strong acid and a weak base, whereby a first solid is formed and a calcium-rich first solution is formed, b) separating, wherein said separating is by a horizontal decanter, whereby the first solution is separated from the first solid, c) carbonation of the calcium-rich first solution using a carbonation gas, whereby calcium carbonate precipitates and a second solution is formed, and d) separating, wherein said separating is by a horizontal decanter, whereby the calcium carbonate is separated from the second solution.

Thus, embodiments described herein comprise a combination of features and advantages intended to address various shortcomings associated with prior art calcium mineralization and carbon dioxide sequestering methods, such as the method provided by Ondrey ("*Slag heaps: a new source of precipitated calcium carbonate*", Ondrey, G. Chemical Engineering [Chem. Eng.]. Vol. 118, no. 1, pp. 14-14. (2011)) and further in Kodama et al., *Energy*, 33, (2008), 779-784; WO 2009/144382; U.S. 2011/0139628; Teir et al., *Energy*, 32, (2007), 528-539; all of which are herein incorporated in their entirety by reference. The various characteristics described above, as well as other features, will be readily apparent to those skilled in the art upon reading the following detailed description, and by referring to the accompanying drawings.

BRIEF DESCRIPTION OF THE DRAWINGS

For a detailed description of the disclosed embodiments of the invention, reference will now be made to the accompanying drawings, wherein:

FIG. 3*a*, is a graphical representation of the change in reaction pH versus time (seconds) over the course of the reaction of calcium rich starting material to production in accordance with the principles herein described.

DETAILED DESCRIPTION OF THE DISCLOSED EMBODIMENTS

Figure 1:
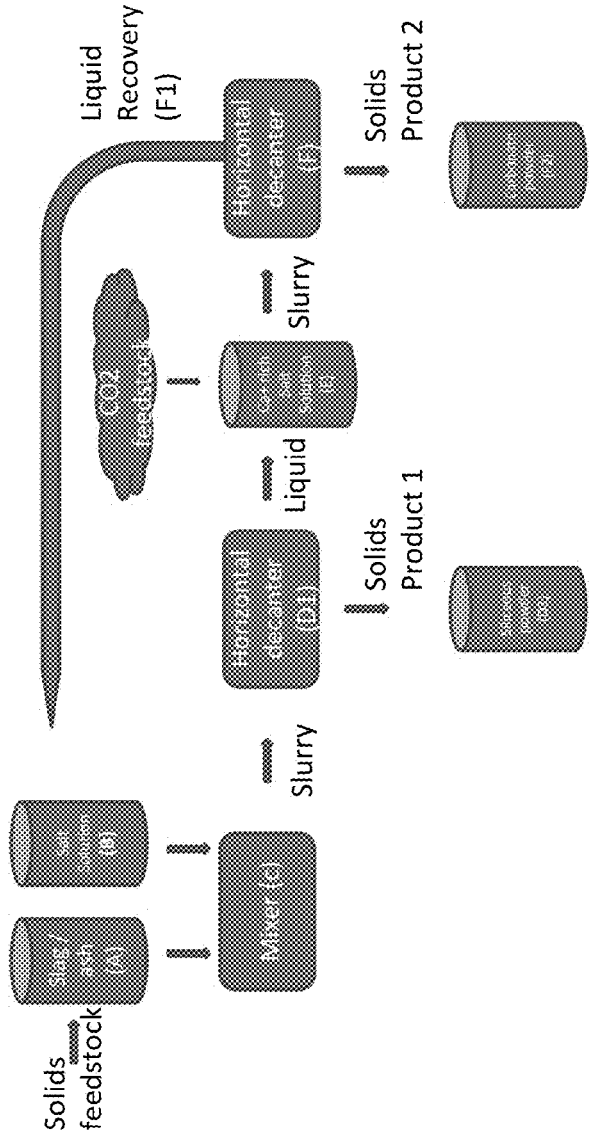
FIG. 1 is a flow chart depicting the process of continuous calcium extraction and PCC production from industrial waste in accordance with principles described herein.

The following discussion is directed to various exemplary embodiments of the invention. However, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and that the scope of this disclosure, including the claims, is not limited to that embodiment.

Certain terms are used throughout the following description and claims to refer to particular features or components. As one skilled in the art will appreciate, different persons may refer to the same feature or component by different names. This document does not intend to distinguish between components or features that differ in name but not function. The drawing figures are not necessarily to scale. Certain features and components herein may be shown exaggerated in scale or in somewhat schematic form and some details of conventional elements may be omitted in interest of clarity and conciseness.

In the following discussion and in the claims, the terms "including" and "comprising" are used in an open-ended fashion, and thus should be interpreted to mean "including, but not limited to . . . ." Also, the term "connect" or "connects" is intended to mean either an indirect or direct connection. Thus, if a first device connects to a second device, that connection may be through a direct engagement between the two devices, or through an indirect connection via other intermediate devices and connections. As used herein, the term "about," when used in conjunction with a percentage or other numerical amount, means plus or minus 10% of that percentage or other numerical amount. For example, the term "about 80%," would encompass 80% plus or minus 8%.

In some embodiments of the current invention, a method is provided for sequestration of environmentally harmful carbon dioxide by integrating carbon mineralization and iron recovery through slag refining. Hence, in some embodiments, the method herein described, provides a process for continuous $Ca^+$ extraction and PCC production utilizing waste carbon dioxide, whilst enriching the metal (iron) content in the siliceous powder fraction. Thus allowing for further economically viable iron extraction, which is significant to the steel and iron recovery industries.

In an embodiment of the present invention, the gas comprising carbon dioxide may be a flu gas, a waste gas from any suitable industrial process, pure $CO_2$ gas, atmospheric $CO_2$ or air. In some embodiments, about 100% of industrial waste input or starting materials are consumed in the method herein described.

In one embodiment of the present invention, a method of mineralizing calcium from industrial waste comprises extracting calcium ions from a suspension of calcium rich granular particles and aqueous ammonium nitrate, and forming a calcium-rich first fraction and a heavy second fraction. The heavy second fraction is separated from the first fraction by centrifugal means, whereby the heavy second fraction comprises an enriched weight percent of iron. The calcium-rich first fraction is then carbonated with a gas comprising carbon dioxide, to form a suspension of precipitated calcium carbonate (PCC), and aqueous ammonium nitrate. The precipitate is then separated from the aqueous ammonium nitrate by centrifugal means (such as a horizontal decanter).

Using the method herein described and further illustrated in FIG. 1, harmful carbon dioxide may be utilized and removed as a contributory green house gas pollutant. Further, waste slag that has very little commercial value beyond low-grade concrete and road fill can be processed to produce valuable precipitated calcium carbonate by mineralization. Additionally, the process of treating the input slag in the mineralization process results in enrichment of the weight of residual elements in a quantity of slag per mineralization cycle, therefore in one embodiment, the percentage content of iron in a sample increases by about 70% with each extraction/recovery cycle, when calcium comprises about 40% by weight of the input slag and iron is present in about 10% by weight of the input slag, These features result in a number of beneficial effects; as previously described iron must be present in the siliceous material at greater than a 10% weight before it becomes economically break even for the steel industry to extract the metal. Therefore, in embodiments of the method herein described, metal extraction becomes economically viable as the concentration of iron in any candidate sample of slag is effectively doubled per cycle, the effective iron output of any subsequent mechanical iron extraction processes are effectively doubled. In addition, chemical bonds are also weakened by the recovery process and thereby aids the down stream mechanical grinding process and separation of iron; by for example electrolysis or magnetization, therefore also reducing energy costs. Other metals will also be enriched by this process, and extracted with the iron.

Referring to FIG. 1, in one embodiment of the method of the current invention, industrial solid waste (A) may be inputted into the process in the form of slag. In another embodiment the industrial solid waste may be in the form of ash. In still another embodiment, the industrial solid waste may be in the form of fly ash, in further embodiments the industrial solid waste may comprise incinerator waste, waste lime, waste stream calcium oxide, kiln dust, waste stream calcium hydroxide and combinations thereof.

In some embodiments, the slag may be pretreated and ground to produce granular particles. Industrial wastes may be pre-milled or may have undergone some cycles of iron recovery, whereby the residual iron would be removed by crushing the granular slag. Such a secondary or tertiary recovery process would deplete the iron content to about 10%, and in doing so produce a course crushed slag particle or fines that are sized through a shaker screen in the order of 100 mesh. In some embodiments the slag may be in the particle size range of about 1 µM to about 500 µm, and in a further embodiment the slag may be in the range of 1 µm to about 250 µm, and in some embodiments, grinding the slag may increase the reactive surface area and increase the rate of leaching.

In some embodiments, where ultra fine particles of pretreated slag (A) are inputted in the method herein described, and illustrated in FIG. 1, there may be 90-99% calcium extraction in about 30 minutes. In some embodiments the slag may be milled, unmilled; granular, quenched (to reduce/fracture particle size); fine; ultrafine particle sizes or combinations thereof.

In some embodiments of the method herein described, the solid industrial waste (A) is treated with a leachate (B). The leachate is an aqueous salt of a strong acid and a weak base. In one embodiment the leachate is ammonium nitrate; in another embodiment the leachate is ammonium chloride. In one embodiment a strong acid is defined as an acid that completely ionizes (dissociates) in water; in other words, one mole of a strong acid HA dissolves in water yielding one mole of $H^+$ and one mole of the conjugate base, $A^-$. In a further embodiment a strong acid is defined as an acid that is at least about 90% ionized in water. In another embodiment a weak base is defined as a chemical base that does not ionize fully in an aqueous solution.

In some embodiments dry granular slag is added to an aqueous solution of ammonium nitrate. Ammonium nitrate ($NH_4NO_3$) reacts with the calcium component of slag, typically a calcium silicate such as $3CaO.SiO_2$, producing for example calcium nitrate ($CaNO_3)_2$; ammonia ($NH_3$); and siliceous materials as a solid by-product.

The calcium nitrate is reacted with $CO_2$, to produce Calcium Carbonate ($CaCO_3$) and $NH_3$ is used in the regeneration of aqueous ammonium nitrate.

In some embodiments the leachate is about 95% recoverable. In other embodiments the leachate is about 99% recoverable. Hence the leachate is effectively catalytic, in the sense that it is not consumed in the reaction but regenerated during the reaction process. The nitrate content of the solution is monitored to maintain the correct leachate stoichiometry. Water or nitrate may be added as required to maintain the correct molar ratio.

In some embodiments, the ratio of [leachate] to [calcium ions] is 1:1; in another embodiment the ratio is 2:1; in another embodiment the ratio of [leachate] to [calcium ions] is in the range of 1:1 to 100:1. In a preferred embodiment the ratio of [leachate] to [calcium ions] is 1.25:1.

In some embodiments, the pH range of the aqueous suspension of leachate is in the range of pH 5 to pH 9, in some further embodiments the pH range is pH 6 to pH 7; and in some further still embodiment the pH range is pH 6.5 to pH 7. In some embodiments the pH range is specific to selective calcium ion extraction.

Figure 2:
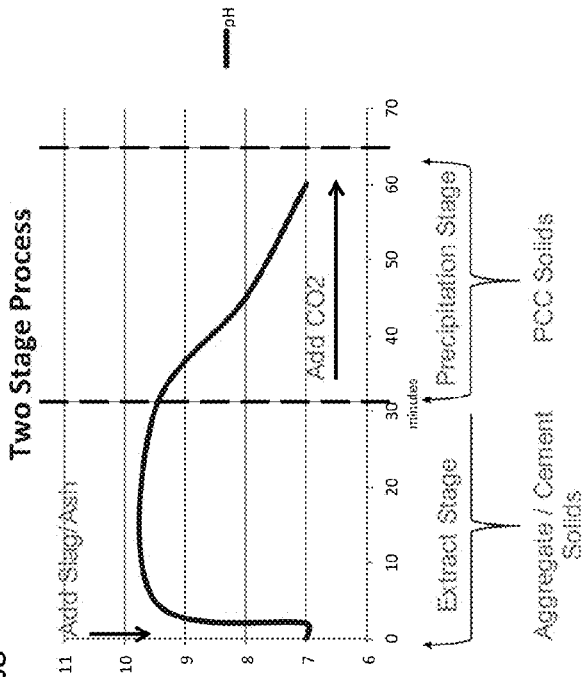
FIG. 2 is a graphical representation of the sequential production and separation of PCC from slag, represented as reaction pH versus time; in accordance with the principles herein described.
Figure 3B:
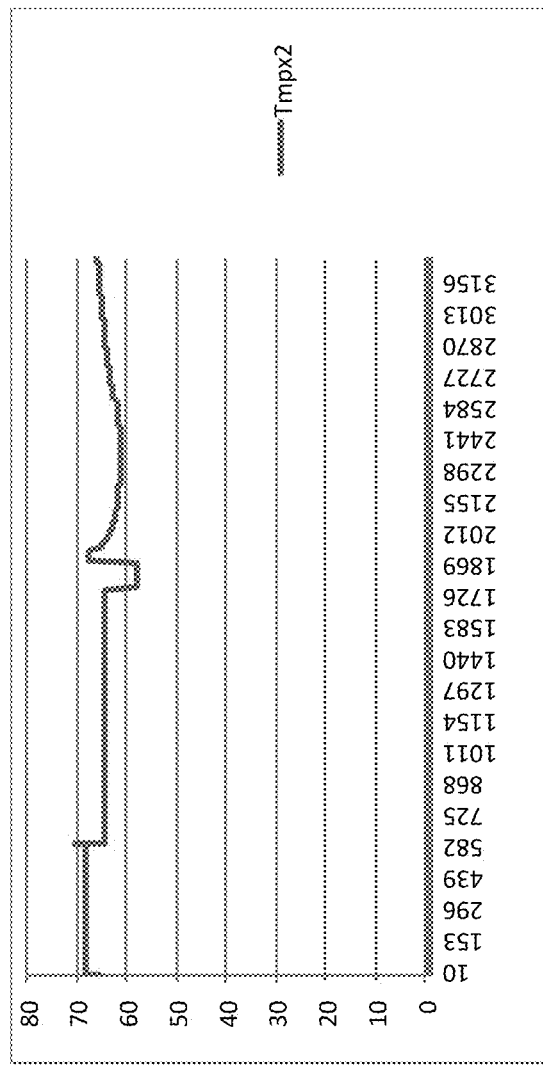
FIG. 3*b*, is a graphical representation of reaction temperature (in degrees Fahrenheit) versus time (seconds) over the course of the production of PCC from a calcium rich starting material; in accordance with the principles herein described.

In one embodiment (as illustrated in FIG. 1 and further in FIG. 2) the reaction process is essentially a two step system, whereby the slag (A) and aqueous leachate (B) are mixed in a mixer (C) to form an aqueous slurry. The slurry is added to a horizontal decanter (D1) which via centrifugal forces allows the separation of the heavy second fraction (siliceous powder (D2), from the first calcium rich fraction. In some embodiments, the starting reaction mixture of leachate and slag has a pH of about 11 (see FIG. 2, and FIG. 3a). As the chemical reaction occurs and calcium is extracted by the leachate, the pH decreases to about pH 9, moving through a pH swing and remains at about pH 9, and as such may be used in some embodiments as a measure of the completion of the reaction, or may indeed be used to control the reaction process.

The second fraction comprises chemically enriched siliceous material/powder (D2) which is visible as black spots or solid particles, and is subsequently removed from the system by decanting. The separation or removal occurs at a very high rate, as seen in fraccing and drilling during a water recovery process. In some embodiments the rate at which such decanters can remove liquid is about 250 to about 400 gallons per minute to about 250 to 400 gallons per minute (such as a Hutchison Hayes horizontal centrifuge decanter Model no. HH 5500. In some embodiments, the decanted fraction is now 50% enriched in the remaining constitutional elements such as Iron, and in some embodiments may be recycled further. As discussed above, for industrial vendors, a fraction comprising a concentration of 60% iron or more is economically valuable. Further, in some embodiments the siliceous material may be used as a component in concrete, exhibiting properties that enhance concrete strength as compared to some conventional concretes. Conventional concretes use ground slag as replacement for sand. However conventional waste slag comprises calcium oxide, which is hygroscopic. It expands when damp, changes in density and causes concrete to crack and weakens the concrete. Hence removal of calcium increases the strength of the concrete. Therefore concrete formed from siliceous materials made by the method described herein, may have increased integrity and strength as compared to some conventional concretes, and further may be compactable as is critical in stabilized soil.

The first calcium rich fraction (E) has a pH of about 8.5 to about pH 9, is reacted with $CO_2$ gas. $CO_2$ is absorbed by the $Ca^{+2}$ ions and calcium carbonate is formed. In some embodiments, within about 10-15 minutes the concentration of precipitated calcium carbonate [PCC] is great enough that the clear solution turns a milky white. Further at between about 5 to about 15 minutes the cloudy solution has a pH of about 8.

The calcium carbonate precipitates out of solution at a rate that is dependent on: the flow and concentration of $CO_2$ in solution; the reaction temperature and reaction pressure; and the pH of the solution. As the pH is monitored, there is a decrease in pH down to pH7, at which point no more precipitation is seen, and correlates with the termination of the reaction, which in some embodiments is due to the process consuming all available $CO_2$.

The entire process may be performed at ambient pressure and ambient temperature. In other embodiments, any one step or any combination of steps may be performed at above ambient pressure; in other embodiments any one step or any combination of steps may be performed at above ambient temperature; in other embodiments any one step or any combination of steps may be performed at below ambient pressure; in other embodiments any one step or any combination of steps may be performed at below ambient temperature; or any combination thereof.

Each parameter may be altered independently or in combination to control the speed of precipitation and hence control the physical properties of the calcium carbonate crystals formed. For example, under ambient conditions and with atmospheric $CO_2$, rhombohedral shaped crystals are formed. In other embodiments, reaction parameters may be controlled to produce one of, or combinations of the calcium carbonate polymorphs vaterite; calcite; and aragonite. The shape of the crystals has an impact on the end product use for the calcium carbonate; rhombohedral crystals will have the densest packing, are relatively smooth and therefore have good flow in plastic molding. It's also beneficial in paper making, imparting good paper density and a glossy surface. If the crystals are slivers such a finish would be matte.

PCC produced by embodiments herein described, may be of a higher quality than ground calcium carbonate. Ground calcium carbonate is not comprised of a uniform reproducible shape and quality and size distribution.

High quality PCC's are also used in the pharmaceutical industry whereby scalenohedral PCC's having a mean particle size of 1.6-2.6 microns are used for example in antacids, cubic PCC's having a mean particle size of 3-5 microns are used for example in baked goods, and prismic PCC's having a mean particle size of 0.6 microns are used for example in liquid foods. Hence the ability to control the crystal growth rate allows the current process to be optimized to produce a specialty PCC product suitable for use in construction through to pharmaceutics and the food industry.

The PCC is separated from the reformed and recycled (as described above) ammonium nitrate (F1) by a horizontal decanter (F); the greater the efficiency of the decanting method, the dryer the solid PCC (F2), the less water is lost and the more efficient the process. Hence in some embodiments presented herein, centrifugal separation is more effective than conventional filtration. This process thereby allows maximum yield of PCC solids and maximum separation of liquids, thereby producing a cleaner high quality product, whereby the product is purer due to better elimination of suspended solids from the heavy fraction.

In some embodiments, the method presented herein may be so placed as to comprise a production unit that may be free standing; or a portable (mobile) unit, mounted on for example a tractor trailer. The process can be operable as a roll out at steel mill with a small footprint of land, or offsite and adjacent to other industrial units that may provide waste gases for the process. Hence one embodiment of the processes herein described may comprise part of a parent industrial process (such as iron and/or steel making), where the mineralization occurs in situ of the parent process, in another embodiment as described above the process may occur proximal to the parent industrial process; or in a further embodiment the mineralization may occur distal from the parent process. The process may operate at ambient temperatures, or use pre-warmed slag directly fed from external industrial processes. In some embodiments the process may be run in parallel with multiple process units.

While preferred embodiments have been shown and described, modifications thereof can be made by one skilled in the art without departing from the scope or teachings herein. The embodiments described herein are exemplary only and are not limiting. Many variations and modifications of the methods and apparatus are possible and are within the scope of the invention. Accordingly, the scope of protection is not limited to the embodiments described herein, but is only limited by the claims that follow, the scope of which shall include all equivalents of the subject matter of the claims.

EXAMPLES

Example 1

Following the PCC recovery method (method of mineralizing calcium from industrial waste) as detailed herein and as illustrated in FIG. 1, an industrial waste material was reacted with leachate, mixed to produce a calcium rich solution (first fraction) and a heavy second fraction. Now referring to Table 1, elemental analysis of a industrial waste starting material (for example slag), indicates the weight percent of metals and their complexes. It can be seen for example that the starting material comprises 23.90 weight percent iron as $FeO_2$. The heavy second fraction or siliceous powder (D2), was extracted by decanting, and underwent elemental analysis. It is apparent for this embodiment that after one recovery cycle (as illustrated in FIG. 1) that the iron content in the siliceous fraction has increased from 23.90 weight % to 32.33 weight percent, thus Illustrating that the methodology herein described produces a first product (FIG. 1, D2) that is greatly enriched in iron, and thereby providing a viable economic starting material for further industrial refinement and a product with increased strength as compared to the industrial starting material.

It can further be seen (Table 1) that the PCC (calcium carbonate produced by sequestering $CO_2$ by the method herein described (FIG. 1, (F2)) comprises only trace quantities of metals, and provides a method for producing a PCC that is 98% pure, comprising rhombohedral crystals of about 4 microns to about 200 microns in size as determined by x-ray diffraction.

Hence the methods herein described provide a number of useful processes; (1) calcium is mineralized by an environmental process that sequesters and utilizes waste $CO_2$; (2) the method allows recycling of reaction solvents and reaction byproducts (such as ammonia) and thereby produces no waste products; thereby (3) producing iron enriched siliceous powder as a viable starting material for further refinement or use in concrete/cement production, and building materials such as LEED certified bricks and shingles; and (4) production of high grade PCC of controllable purity and crystallographic quality.

TABLE 1

| ELEMENTAL COMPLEX | STARTING MATERIAL Weight % | HEAVY FRACTION PRODUCT Weight % | PCC Weight % |
| --- | --- | --- | --- |
| $SiO_2$ | 13.13 | 10.29 | <0.01 |
| $Al_2O_3$ | 4.60 | 5.37 | <0.01 |
| $Fe_2O_3$ | 23.90 | 32.33 | <0.01 |
| CaO | 36.24 | 31.47 | 54.24 |
| MgO | 10.68 | 9.42 | 0.12 |
| $SO_3$ | 0.39 | 0.22 | 0.29 |
| $Na_2O$ | 0.06 | 0.03 | 0.01 |
| $K_2O$ | 0.04 | 0.03 | 0.01 |
| $TiO_2$ | 0.37 | 0.47 | 0.10 |
| $P_2O_5$ | 0.53 | 0.62 | <0.01 |
| $Mn_2O_3$ | 4.13 | 3.41 | <0.01 |
| SrO | 0.02 | 0.020 | 0.02 |
| $CR_2O_3$ | 0.20 | 0.17 | 0.01 |
| ZnO | 0.04 | <0.01 | 0.01 |
| BaO | 0.04 | 0.04 | 0.01 |
| L.O.I (950° C.)$^2$ | 5.04 | 6.39 | 45.29 |
| Total | 99.41 | 100.30 | 100.12 |

What is claimed is:

1. A method of mineralizing calcium from industrial waste comprising:
   a. extracting calcium ions from a suspension of calcium rich particles and aqueous ammonium nitrate, forming a calcium-rich first fraction and a heavy second fraction; wherein said heavy second fraction is separated from said first fraction by centrifugal means;
   b. carbonating the calcium-rich first fraction with a gas comprising carbon dioxide, forming a suspension of precipitated calcium carbonate, and aqueous ammonium nitrate, wherein said precipitate is separated from said aqueous ammonium nitrate by centrifugal means; and
   wherein said heavy second fraction comprises an enriched weight percent of iron.

2. The method of claim 1, wherein said gas comprising carbon dioxide is industrial flu gas; industrial waste gas; pure CO2 gas; atmospheric CO2 or combinations thereof.

3. The method of claim 1, wherein said calcium rich particles may be at least one of ash, fly ash; kiln dust; incinerator waste; waste lime; waste stream calcium oxide; or waste stream calcium hydroxide.

4. The method of claim 1, wherein said particles are in granular form.

5. The method of claim 1, wherein said centrifugal means is a horizontal decanter.

6. The method of claim 1, wherein said method occurs under ambient temperature and ambient pressure.

7. The method of claim 1, wherein said mineralization occurs in situ of an industrial process.

8. The method of claim 1, wherein said mineralization occurs proximal to an industrial process.

9. The method of claim 1 wherein said method is performed on a movable object.

10. The method of claim 1, wherein said calcium carbonate is crystalline and wherein said crystals comprise at least one of scalenohedral, rhombohedral and prismatic, crystals.

11. A method of claim 10, wherein said calcium carbonate is at least 95% pure; and is comprised of at least 90% rhombohedral crystals.

12. The method of claim 11, wherein said crystals are about 5 mm to about 200 microns in size.

13. The method of claim 1, wherein said method is zero sum energy method.

14. A method of enriching the iron content of calcium rich industrial waste the method comprising:
   extracting calcium ions from a suspension of starting material of calcium rich industrial waste and aqueous ammonium nitrate, forming a calcium-rich first fraction and a heavy second fraction; wherein said heavy second fraction is separated from said first fraction by centrifugal means; wherein said heavy second fraction comprises an enriched weight percent of iron.

15. The method of claim 14, further comprising carbonating the calcium-rich first fraction with a gas comprising carbon dioxide, forming a suspension of precipitated calcium carbonate (PCC), wherein said PCC is separated from said aqueous ammonium nitrate by centrifugal means.

* * * * *